United States Patent Office 2,726,316
Patented Dec. 6, 1955

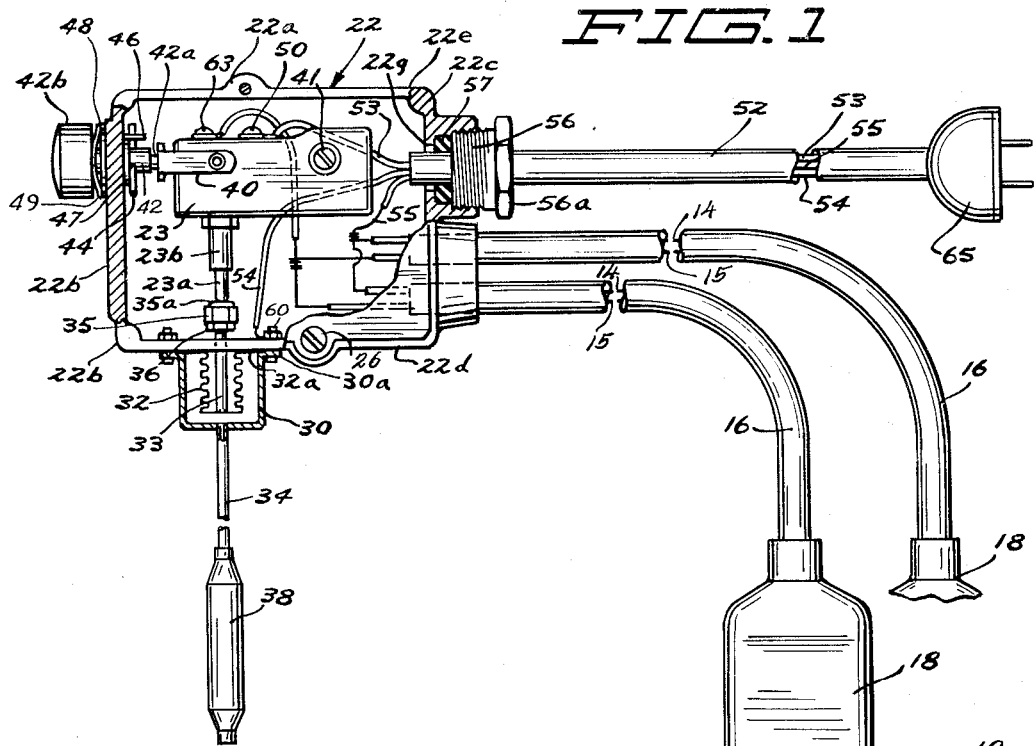
FIG. 1
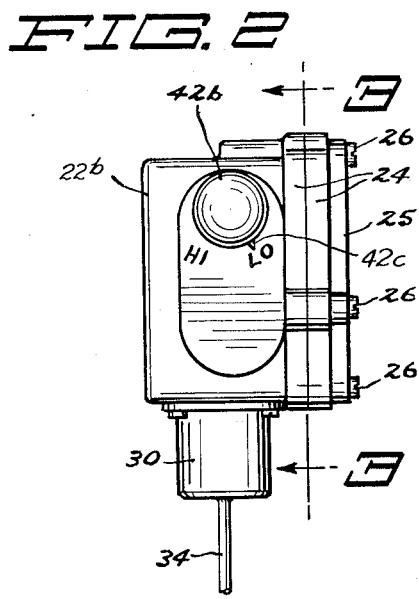
FIG. 2
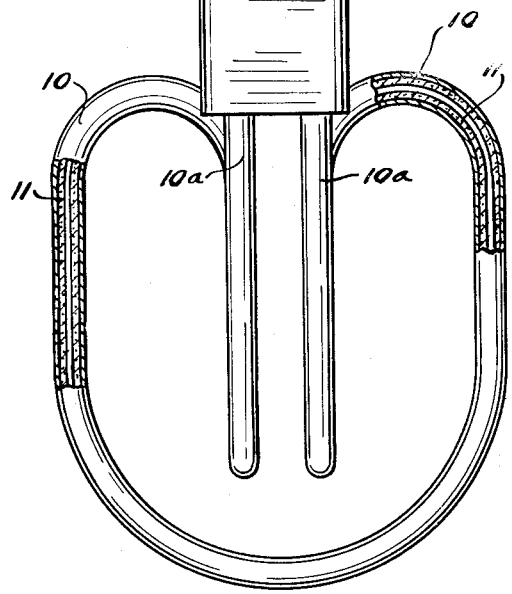
INVENTORS
JESSE A. CRAWFORD
ADELBERT H. MELCHERT
GERRIT A. VISSER
BY Chas. C. Reif
ATTORNEY Dec. 6, 1955  G. A. VISSER ET AL  2,726,316
HEATING DEVICE AND METHOD OF MAKING SAME
Filed Dec. 24, 1952  2 Sheets-Sheet 2
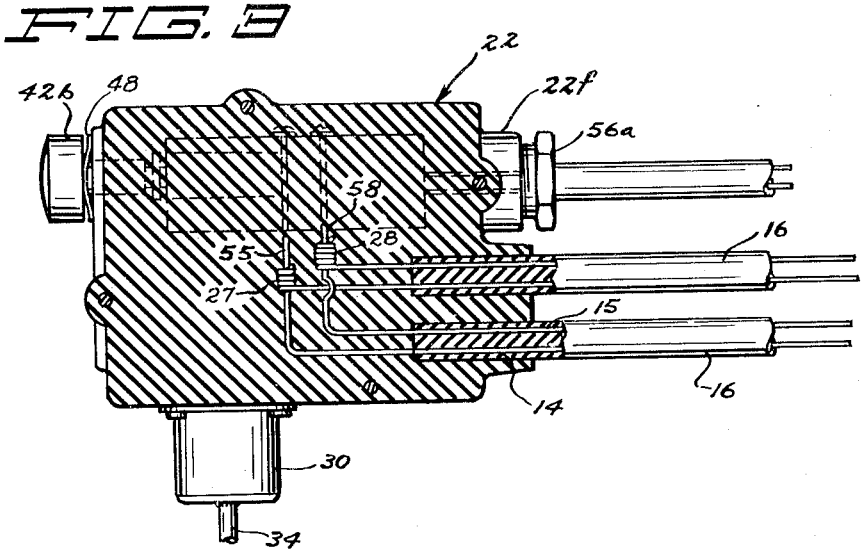
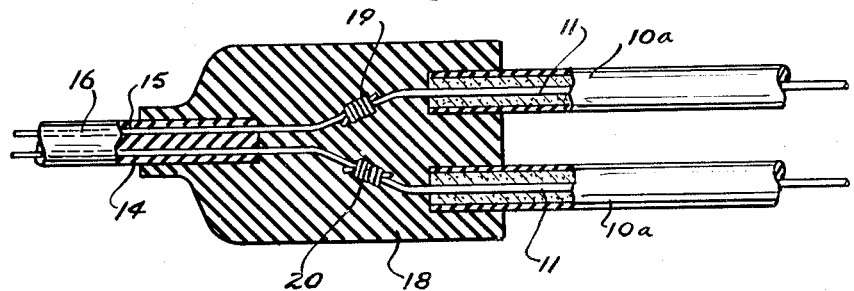
INVENTORS
JESSE A. CRAWFORD
ADELBERT H. MELCHERT
GERRIT A. VISSER
Chas. C. Reyf.
ATTORNEY.

2,726,316

HEATING DEVICE AND METHOD OF MAKING SAME

Gerrit A. Visser, Adelbert H. Melchert, and Jesse A. Crawford, Waterloo, Iowa, assignors to Hawkeye Steel Products Inc., Waterloo, Iowa, a corporation of Iowa Application December 24, 1952, Serial No. 327,867

11 Claims. (Cl. 219—41)

This invention relates to a device for heating water in a feeding device for poultry or stock, such as domestic animals, or for heating a similar medium in related devices. Such devices for heating water or other mediums in animal watering and feeding devices have been used for some time in the art, particularly in the colder climates where it is necessary to keep said water or other medium from freezing. Said devices have generally included a control device including a switch controlled by a thermostatic device for regulating the current supplied to the heating device and thus regulating the temperature of said medium between certain limits. A very serious problem has arisen due to the extreme corrosion of the parts of said control and the electrical connections used in said devices. The control parts and electrical connections have been corroded to an extreme extent due to moisture coming in contact therewith and due to corrosion by said moisture and by certain acids and gases which are generated or produced.

It is an object of this invention to provide a heating device comprising a heating unit, a regulating control including a switch, and a thermostatic member comprising a unit hermetically sealed against entrance of liquids or gases.

It is a further object of the invention to provide such a device comprising a control including a switch and certain electrical connections, which connections are enclosed in a vulcanized block so that they are protected absolutely against moisture or corrosion by liquids, acids or gases.

It is a further object of the invention to provide such a device including a heating element and a regulating control mechanism including certain electrical parts and connections, together with means for protecting said parts and connections from contact with corroding moisture, acids or gases.

These and other objects and advantages of the invention will be fully set forth in the following description made in connection with the accompanying drawings in which like reference characters refer to similar parts throughout the several views and in which:

Fig. 1 is a plan view of the device;

Fig. 2 is a view in elevation of one end of said device;

Fig. 3 is a vertical section taken on line 3—3 of Fig. 2; and

Fig. 4 is a vertical section taken parallel to the plane of the drawing in Fig. 1 and to the center of the conduits shown.

Referring to the drawings, a heating element 10 is shown. Element 10 is heated by electrical conductors 11 disposed therein, which conductors have a high resistance. The members 10 are preferably made of metal tubes. The metal of said tubes may be copper, steel or alloys of the same. The electrical conductors 14 and 15 supplying current to members 11 are carried in a conduit 16 preferably made of rubber or similar material. Said conduit 16 extends into a block 18 of rubber or similar material. This block 18 is originally in two parts divided along a central plane, as shown in Fig. 4. The end portions 10a of member 10 extend into one end of block 18, said end being opposite to the end into which flexible conduit 16 extends. Conductors 14 and 15 are connected to the members 11 or to conductors connected to the members 11 within member 10. The connections or joints between conductors 14 and 15 and the other conductors are shown as 19 and 20. When the members 10a, 16, 14 and 15, and 11, including the joints 19 and 20 have been placed in the two parts of block 18, said parts are clamped together and then vulcanized in the usual manner or fused together, so that block 18 becomes an integral block and becomes integral with conduit 16 and has a very tight bond with portions 10a forming an absolute seal. Two of the members 10 are provided, but only a portion of one of them is shown in Fig. 1. The conduits 16 are connected to a switch casing 22 in which is disposed a second switch casing 23 containing a switch constructed and arranged for accurate adjustment, such as the well known microswitch. Switch casing 22 has an open side and a block 24 of yielding material, such as rubber or similar material, is pressed against said side by a metal plate 25 connected to casing 22 by headed screws 26 passing through plate 25, block 24 and into bosses on casing 22. Block 24, like block 18, is originally provided in two parts, the same being provided through the central plane of said block. The conduits 16 are placed between the two parts and the conductors 14 and 15 in said parts are connected to a pair of conductors 55 and 58, conductors 15 being connected to conductor 58 and conductors 14 being connected to conductor 55. The joints connecting said conductors are designated 27 and 28. The conductors 55 and 58 extend through the side of block 24 into casing 22. When the members are assembled between the parts of block 24, as described, said parts are pressed firmly together and are vulcanized together or fused together in the usual manner, so that the parts become integral and are also integral with the conduits 16. Casing 22 has an opening in one side and a casing 30 of general cylindrical form is secured thereto, said casing having a base plate portion 30a recessed to receive the enlarged end flange 32a of a bellows member 32 disposed in casing 30. A rod 33 is secured to the end of bellows 32 and extends into casing 22, the same being threaded to receive nuts 36 and 35. Nut 35 has a central projection 35a which is adapted to engage the end of a plunger 23a projecting from switch casing 23, which plunger is moved to close and open the switch in casing 23. A tube 34, usually of metal, extends from the end of casing 30 and is connected at its other end to an elongated casing 38, preferably made of metal. Tube 34 is integral with casing 30 and is sealed with an absolute seal to casing 38, as being welded or soldered therein. Casing 23 is mounted for swinging movement about the axis of a screw 41 extending therethrough and into one side of casing 22. Casing 23 at its other end is provided with a yoke 40 fixedly secured thereto and said casing 23 and said yoke 40 are swung about the axis of screw 41. Casing 23 and yoke 40 are swung about the axis of screw 41 by a portion 42a of a member 42 extending through the end of casing 22 and being provided at the outer side of said casing with a knob handle 42b. The portion 42a is eccentric to member 42. A pin 44 extends through member 42 and is arranged to engage a pin 46 projecting inwardly from the end of casing 22. A washer 47 of yielding material, such as rubber, is disposed between pin 44 and the inner side of end portion 22b and a similar washer 48 is disposed at the outer side of end 22b. A spring 49 is disposed between the outer side of washer 48 and the knob handle 42b and presses both against said knob handle and washer 48 and also tends to move member 42 outwardly to press pin 44 against washer 47.

A flexible conduit 52, preferably made of rubber or rubber composition, has therein a plurality of conductors 53 and 54 and 55. Conduit 52 extends through a boss 22f projecting from the end 22c of casing 22. Casing 22 is of box-like form, being rectangular in horizontal and vertical cross sections. The same has a bottom portion 22, end portions 22b and 22c and side portions 22d and 22e. Boss 22f is bored and interiorly threaded and an opening 22g extends from said boss into casing 22. A gland 56 having a hexagonal end flange 56a is threaded into boss 22f and its inner end engages a block or washer 57 made of yielding material, such as rubber or similar material. Block 57 is thus pressed against the bottom of boss 22f around the opening 22g and will expand and be pressed against the threads in boss 22f. Conduit 52 tightly engages the block 57 and may be vulcanized thereto. The conductor 55 is disposed in casing 22 and this will be connected to the conductors 14. The conductor 54 is disposed in casing 22 and will be connected to a contact 60 on switch casing 22. Conductor 53 is disposed in casing 22 and will be connected to a contact formed by one of the screws 50 so that it will be connected to casing 22. Conductor 58 is connected to a contact 63 on casing 23 and as previously stated is connected to conductors 15. Conduit 52 has connected to its other end a plug 65 adapted to be inserted in a customary electrical socket having electric current supplied thereto. After the parts have been assembled in casing 22, the same is preferably dipped into a solution of molten rubber or similar composition so that a comparatively thin coating of such rubber or composition is provided over the whole extent of said casing 22 and parts connected directly thereto so that this completes the absolute or hermetical seal against entry of any liquids or gases. Knob 42b carries a pointer 42c adapted to cooperate with indicia HI and LO on casing 22.

In the operation of the device, the members 10 are suitably supported in contact with or in close proximity to the watering trough or in other desirable positions relatively to a feeding device. Current will be supplied to the conductors in conduit 52 and the current will pass through the micro-switch in switch casing 23. The member 38 will now be placed in the said water or other medium. If the said water rises in temperature beyond a certain point, a fluid or gas in member 38 will expand and this will act to contract bellows 32 so that rod 33 will be moved inwardly of casing 22 and projection 35a will engage plunger 23a and operate the switch in casing 23 to shut off the current. Should the temperature in the water drop below a certain temperature, the fluid or gas in member 38 will contract and this will permit bellows 32 to expand and rod 33 will be moved outwardly. This will permit plunger 23a to move outwardly and the switch in casing 23 will close so that current will again be supplied to the heating members 10 and 11. The invention consists primarily in providing a device which constitutes a unit absolutely insulated from liquid or corroding gases. A heating device for stock and poultry feeders constituting such a unit completely or hermetically sealed against the entry of liquids or gases is believed to be entirely new. The production of such a unit was only arrived at after much investigation and experiment.

From the above description it will be seen that we have provided a device which can be safely used to keep the stock and poultry feeders in proper and useable condition during cold weather and the same will not be injuriously affected by the liquids, acids and corroding gases which are generated in such a device. Much work has been put on the problem of protecting such a device from corrosion and the present device has been shown to have solved the problem. As above stated, the corrosion caused by liquids, acids and gases in such a device has been almost unbelievable. Such a corrosion occurred when it was supposed that the devices were well insulated.

The device has been amply demonstrated in actual practice, found to be very successful and efficient and the same is being commercially made.

It will of course be understood that various changes may be made in the form, details, arrangement and proportions of the device and in the steps and sequence of steps of the method without departing from the scope of applicants' invention, which, generally stated, consists in a method and device capable of carrying out the objects above set forth, such as disclosed and defined in the appended claims.

What is claimed is:

1. A device of the class described having in combination, a casing, a switch enclosed in said casing, a thermostatic means adapted to be placed in the medium to be heated, said means including a second casing impervious to liquids and gases, a conduit impervious to liquids and gases integrally connected to said second casing, said conduit being connected to said first mentioned casing and hermetically sealed thereto, a metallic heating member, electric heating elements in said member, a block of insulating material, a flexible second conduit of insulating material impervious to liquids and gases, said heating member and said second conduit being connected to said block by a hermetically sealed union, electric conductors in said second conduit, said conductors and said heating elements being connected by joints, said joints being imbedded and entirely enclosed in said block, conductors extending from said first mentioned casing and being connected to the conductors in said second conduit by joints, a second block of insulating material having a flat side, said last mentioned joints being imbedded in said second block, said conductors from said first mentioned casing extending through said flat side of said block, said second conduit being integrally connected to said second block, said second block being held against said first mentioned casing to close said open side thereof and being hermetically sealed to said first mentioned casing whereby said device comprises a unit which is hermetically sealed throughout to enclose said heating elements and said conductors and joints of the same.

2. A device of the class described having in combination, a metallic heating member having rigid tubular terminals, electric heating elements in said member and extending through said terminals, a flexible conduit of rubber-like material, a block of rubber-like insulating material, electric conductors in said conduit, said conductors and electric heating elements being respectively connected by joints, said joints being imbedded and entirely surrounded in said block, said block being fusibly connected to said terminals and to said conduit, a switch casing of box-like form having an open side, a second block of rubber-like insulating material, electric conductors extending from said switch casing, said latter conductors and the conductors in said conduit being connected by joints, said joints being imbedded in said second block and entirely surrounded thereby, said conduit being fusibly connected to said second block to be integral therewith, said conductors from said casing extending through a side of said block, said block being held with said side against the open side of said casing and being hermetically sealed throughout thereto whereby said casing, conduit and heating member constitute a unit hermetically sealed to enclose the elements therein.

3. A heating device structure having in combination, a rigid metallic heating member impervious to liquids and gases, electric heating elements in said member, a flexible conduit of insulating material impervious to liquids and gases and having electrical conductors therein respectively connected to said elements, a block of insulating material impervious to liquids and gases connected to said member and conduit by being fused thereto, said elements and conductors being connected by joints disposed in said block, a switch casing impervious to liquids and gases, and means connecting said casing and conduit and hermetically sealing said conduit thereto whereby said heating member, conduit and casing constitute a hermetically sealed unit impervious to liquids and gases.

4. A heating device structure having in combination, a metallic heating member impervious to liquids and gases and having electric heating elements therein, a conduit of insulating material having electrical conductors therein, said heating member having a tubular terminal through which said elements project, a block of insulating material, said terminal being connected to and hermetically sealed to said block, said conduit being integrally connected to said block, said elements and said conductors being connected by joints imbedded and entirely enclosed in said block, a switch casing, said conduit being connected to and hermetically sealed to said casing, whereby said casing, conduit, heating element and block form a unit having an exterior impervious to liquids and gases and hermetically sealing the parts therein.

5. The method of making a heating device structure which consists in connecting a metallic heating member impervious to liquids and gases, having electric heating elements and rigid terminals with electrical conductors therein to a pair of flexible conduits by forming a block of insulating material impervious to liquids and gases fusing said block to said terminals to form a moisture-proof connection, respectively connecting said conductors to a pair of second conductors respectively by joints, imbedding said joints in said block extending said conductors through said conduits respectively and fusing said conduits to said block and connecting said conduits to a switch casing impervious to liquids and gases and hermetically sealing the same thereto whereby said heating member, conduit and casing constitute a hermetically sealed unit throughout impervious to liquids and gases.

6. The method of constructing a heating member which consists in providing a casing having a switch therein with conductors extending therefrom, said casing having an open side, providing a thermostatic device for operating said switch comprising a closed casing and conduit extending therefrom, securing said conduit to said casing with a connecting means, sealing said connecting means against entry of moisture, making joints for sealing said last mentioned means, respectively connecting said conductors from said casing to a pair of second conductors extending said second conductors through a pair of conduits of moisture-proof and insulating material, placing said joints and adjacent portions of said conduit between layers of fusible insulating material with said conduits from said casing extending through a side of one of said layers, fusing said layers and conduits together to form an integral unit impervious to moisture, placing said unit over said open side of said first mentioned casing, securing said unit to said casing by connecting means and sealing said connecting means against entry of moisture.

7. The method set forth in claim 6, with the additional step of dipping said first mentioned casing in a body of molten insulating material to form a coating on said casing hermetically sealing the same whereby said casing, thermostatic device and said conduit form a unit impervious to liquids and gases and forming a hermetical seal over the contents thereof.

8. The method of making a heating device for use with a feeding device which consists in providing a metal heating member containing electrical heating elements, said member having a terminal tubular portion through which electrical conductors from said elements project, providing a flexible conduit of fusible insulating and moisture-proof material, said conduit containing second electrical conductors, making joints respectively connecting said electrical conductors from said heating elements to said second conductor, placing said joints and adjacent portions of said conduit and terminals between two layers of fusible insulating material, fusing said layers together into one block imbedding said joints, and portions of said conduit and said terminal.

9. The method set forth in claim 8, with the additional step of providing a switch casing having an open side and having electrical conductors extending therefrom, making joints respectively connecting said second conductors to said first mentioned electrical conductors by joints, placing said joints and adjacent portions of the other end of said conduit between a pair of layers of fusible insulating material, fusing said layers and conduit together into a block fusibly connected to said conduit and completely surrounding said joints, placing said block over said open side of and against said casing to make a tight seal whereby said casing, conductors and heating member form a water and moisture tight unit hermetically sealing the parts therein.

10. A heating device for water troughs or feeding troughs for animals having in combination, a casing, a temperature control switch in said casing, a thermostat comprising a water and moisture-proof second casing, a conduit connected to said second casing by a water and moisture-proof connection, a third casing having therein means for operating said switch, said third casing being connected to said first mentioned casing by a water and moisture-proof connection, a water and moisture-proof connection connecting said conduit and third casing, electrical conductors in said first mentioned casing, a pair of second conductors, joints connecting said first mentioned and second mentioned conductors respectively, a pair of waterproof and insulating conduits, said second conductors being disposed in said second conduits respectively, a block of waterproof and insulating material in which said joints and the end portions of said conduits are imbedded, a rigid metallic water heater having rigid tubular terminal portions, a second block of insulating and waterproof material, the other end portions of said conduits and of said terminals being imbedded in said second block, said first mentioned block being connected to and forming a side of said first mentioned casing and being sealed thereto against the entry of moisture whereby said thermostat, tube, first mentioned casing, second casing, conduits and heating member form a connected unit, all parts of which are water and moisture-proof throughout.

11. The method of making a heating device for heating a watering trough or feeding trough for animals which is impervious to moisture or water throughout which consists in connecting a metallic heating member having rigid tube-like terminals with electrical conductors in and extending therefrom respectively to a pair of conduits of moisture-proof and insulating material and having conductors therein, respectively connecting said conductors extending from said terminals to said conductors in said conduits by joints, imbedding said joints and the end portions of said conduits and terminals in a block of insulating, waterproof material, said second conductors extending through said second conduits, imbedding the other end portions of said conduits in a second block of insulating and moisture-proof material, connecting said second conductors to a third pair of conductors respectively by second joints, imbedding said second joints in said second block of material with said third pair of conductors extending through one side of said second block and connecting said block to an open side of an otherwise closed casing by a moisture and waterproof connection.

References Cited in the file of this patent

UNITED STATES PATENTS

| | | |
|---|---|---|
| 2,018,512 | De Laney et al. | Oct. 22, 1935 |
| 2,052,644 | Murphy | Sept. 1, 1936 |
| 2,254,330 | Stiebel | Sept. 2, 1941 |
| 2,508,512 | Grinde | May 23, 1950 |
| 2,561,932 | Landgraf | July 24, 1951 |
| 2,566,921 | Briscoe | Sept. 4, 1951 |